INVENTOR.
THOMAS D. STEVENS
ROBERT B. HUGHES
BY
*Robert B. Hughes*

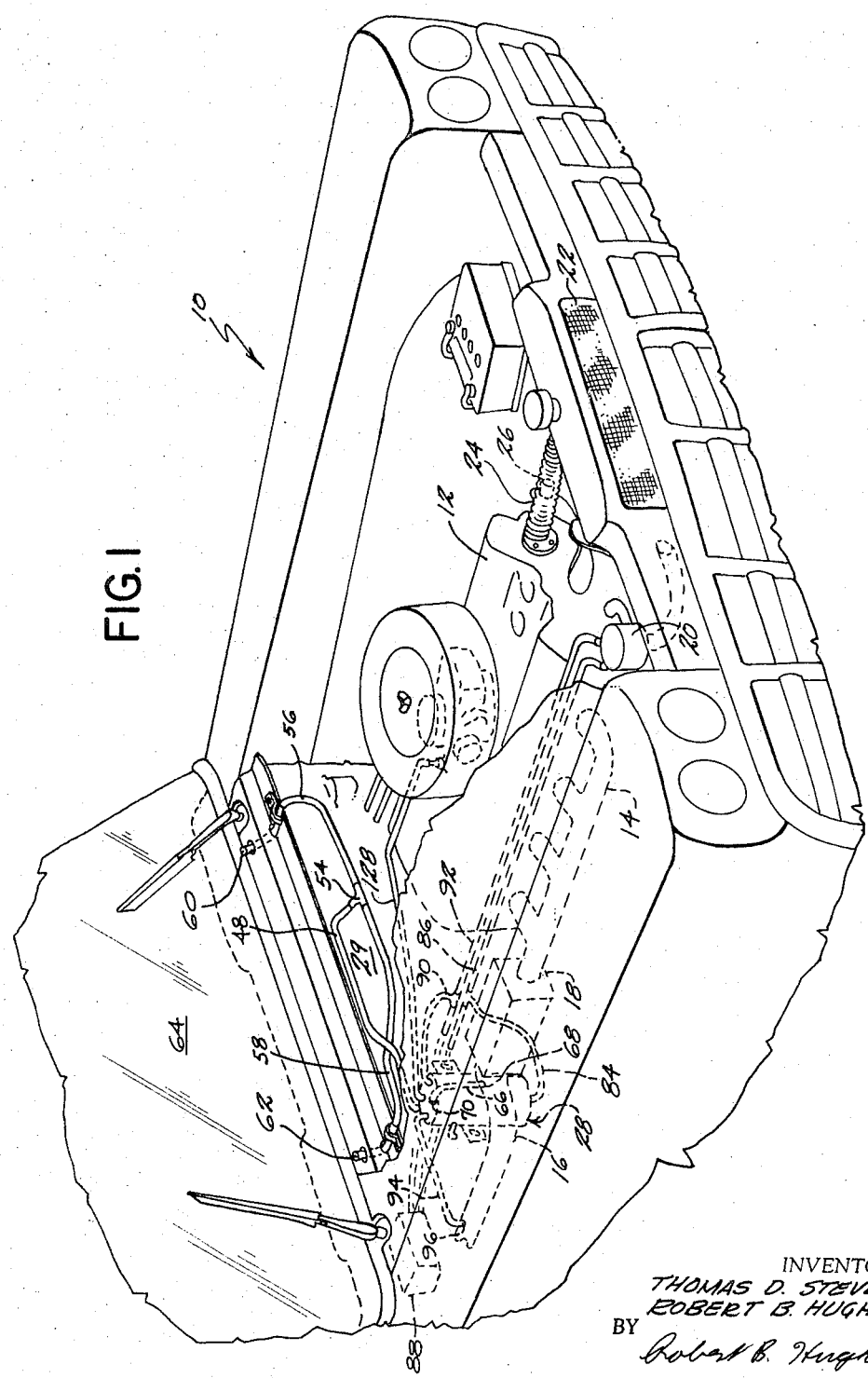

ATTORNEY

Nov. 14, 1967  T. D. STEVENS ET AL  3,352,353
AUTOMOBILE ACCESSORY APPARATUS
Filed Sept. 7, 1965  7 Sheets-Sheet 3
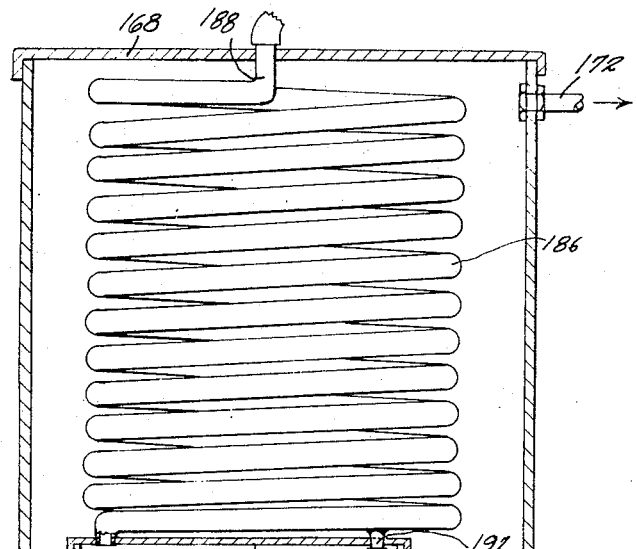
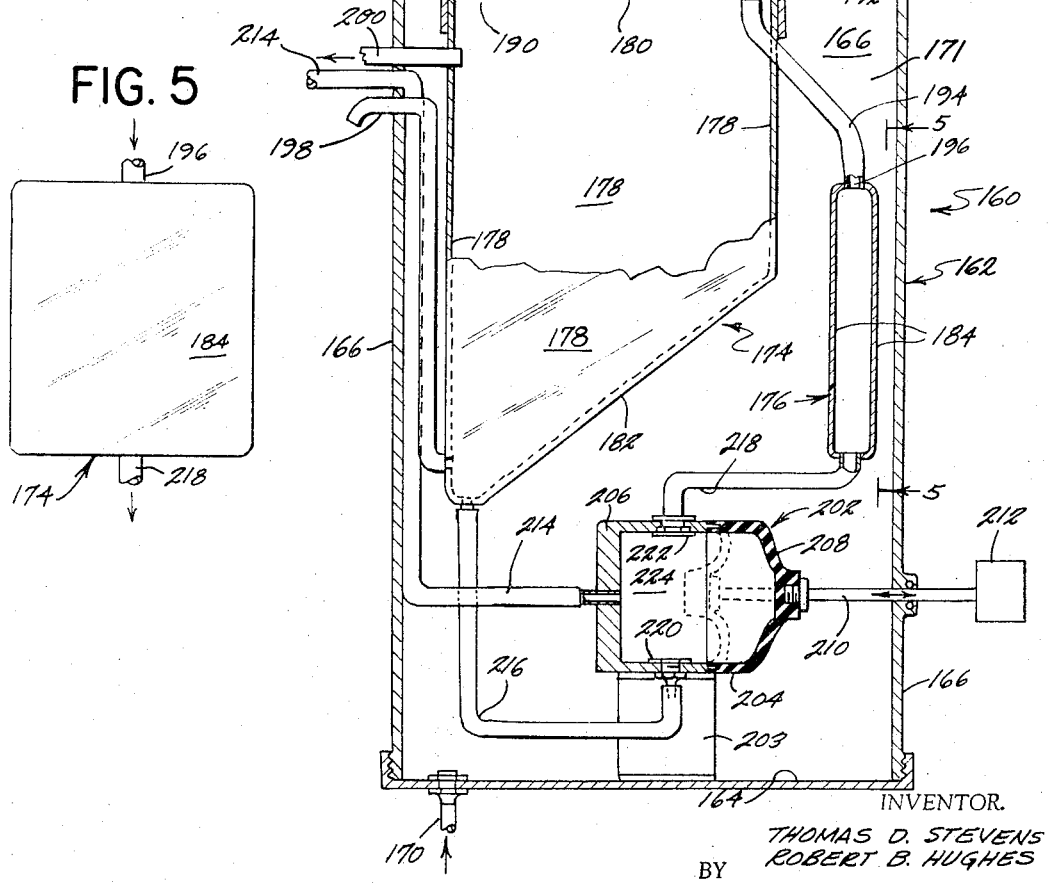
INVENTOR.
THOMAS D. STEVENS
ROBERT B. HUGHES
BY
Robert B Hughes
ATTORNEY

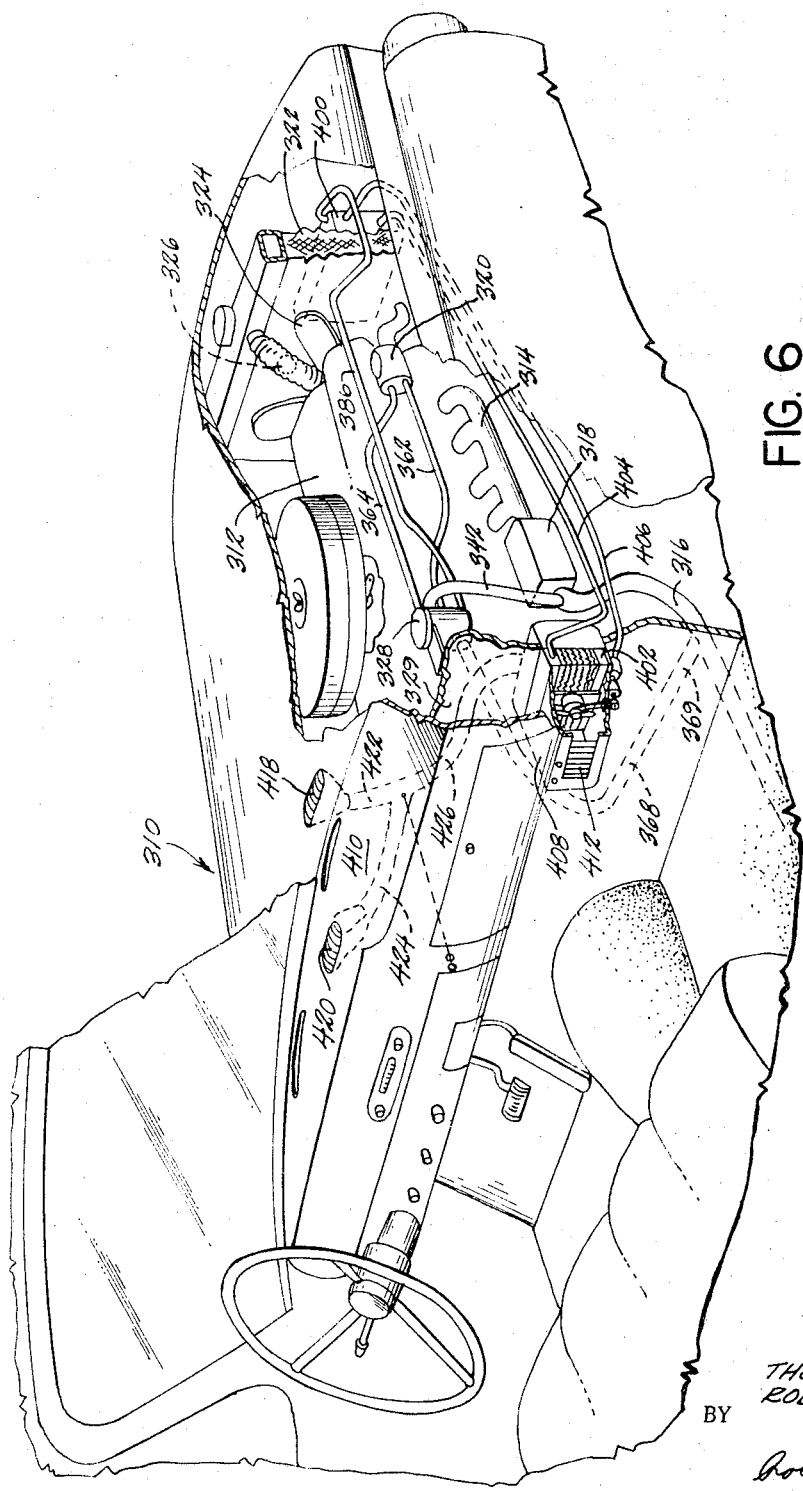

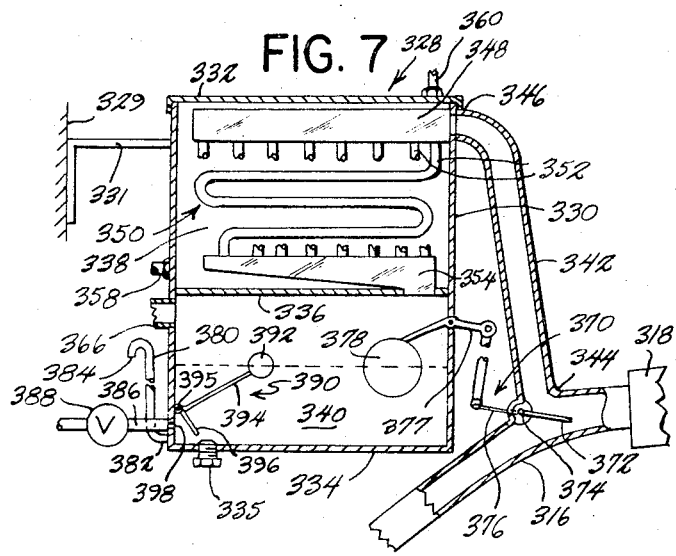
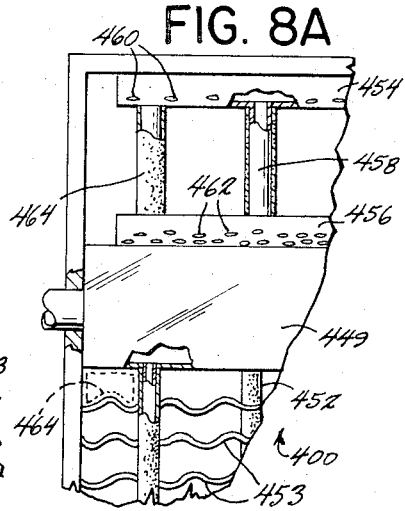
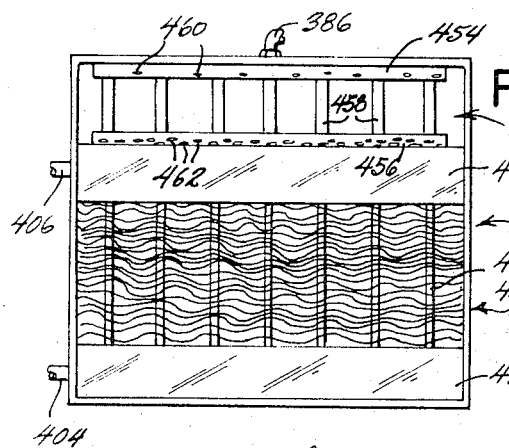
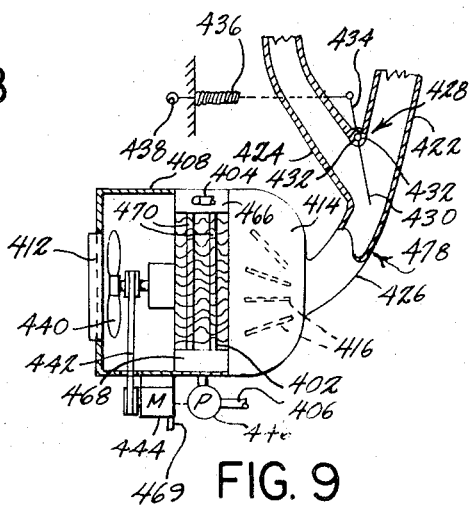
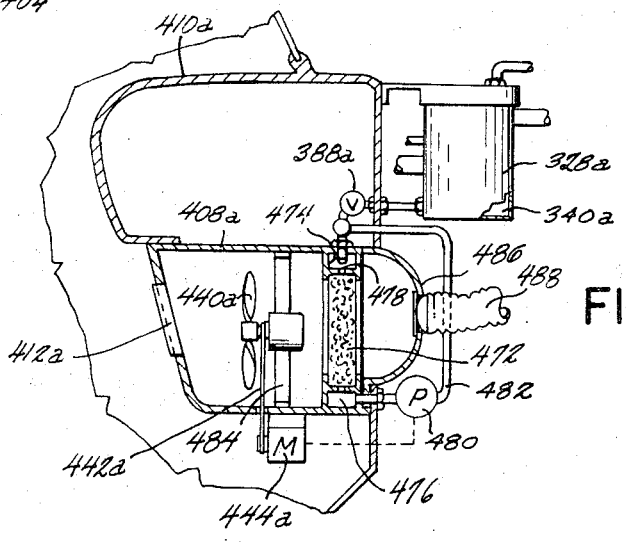

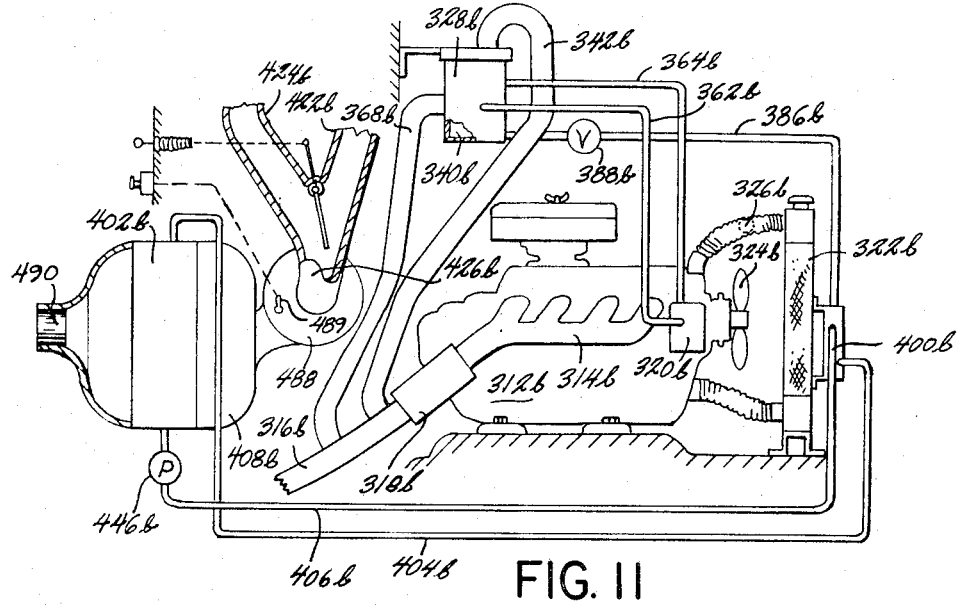
FIG. 11
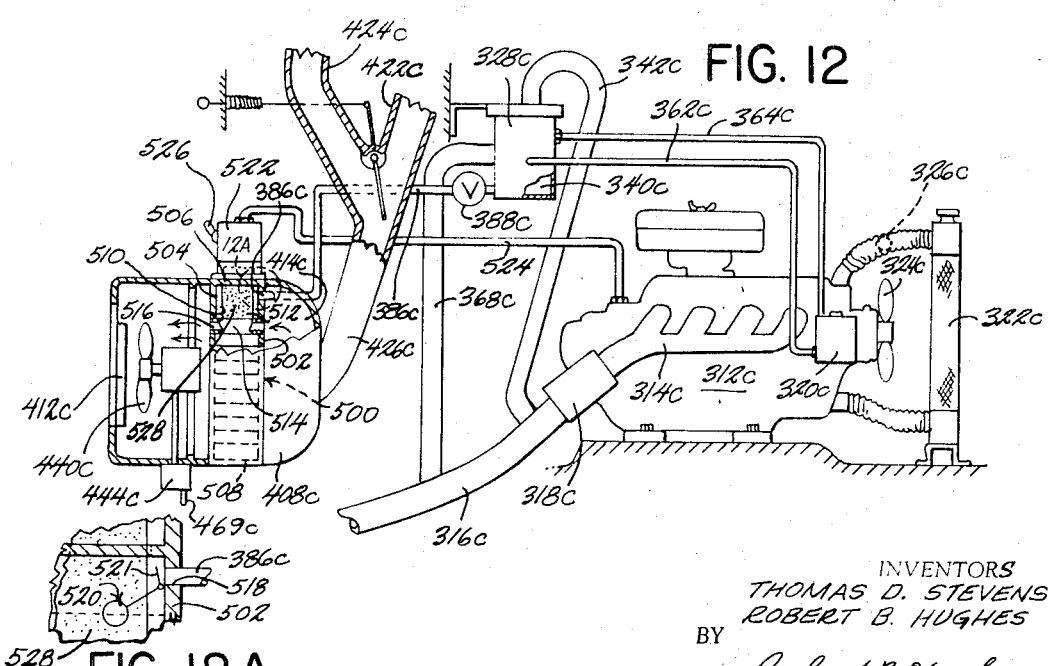
FIG. 12
FIG. 12A
INVENTORS
THOMAS D. STEVENS
ROBERT B. HUGHES
BY
Robert B. Hughes
ATTORNEY

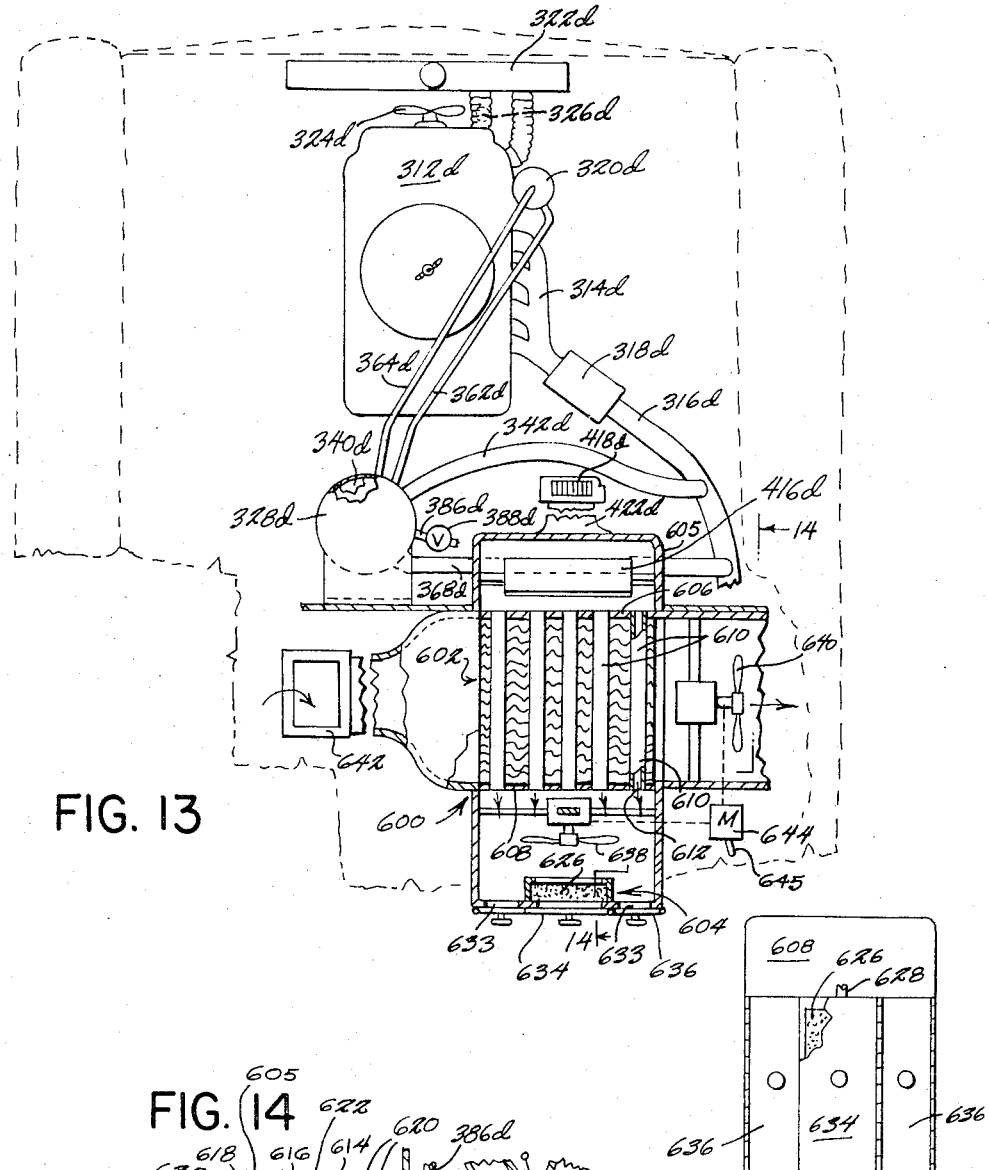
FIG. 13
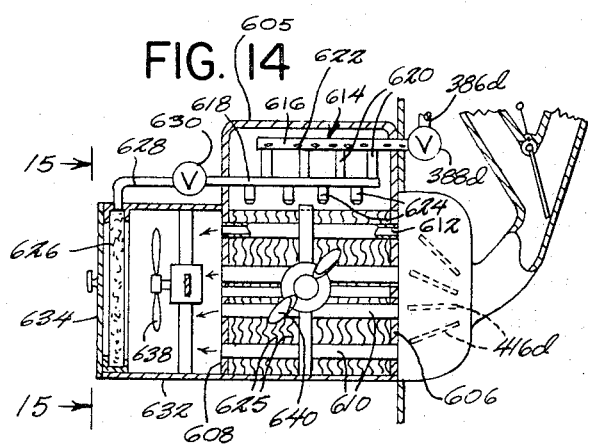
FIG. 14
FIG. 15
INVENTORS
THOMAS D. STEVENS
ROBERT B. HUGHES
BY
Robert B. Hughes
ATTORNEY

United States Patent Office 3,352,353
Patented Nov. 14, 1967

3,352,353
AUTOMOBILE ACCESSORY APPARATUS
Thomas D. Stevens and Robert B. Hughes, Minneapolis, Minn., assignors of one-fourth each to Joseph L. Stevens, St. Paul, John D. Skildum, Minneapolis, Frank J. Hughes, Hopkins, and Robert B. Hughes, Minneapolis, Minn.
Filed Sept. 7, 1965, Ser. No. 489,797
21 Claims. (Cl. 165—41)

ABSTRACT OF THE DISCLOSURE

A water condensing heat exchanger mounted in an automobile, which heat exchanger brings at least a portion of the engine exhaust which has passed through an afterburner into heat exchange relationship with the water that is circulated through the radiator of the automobile and used to cool the engine, moisture being condensed from the engine exhaust and being collected in a reservoir. In two embodiments, the condensed water is used in a windshield washing apparatus. In other embodiments the condensed water is used in a water evaporative heat exchanger to cool the passenger compartment of the automobile.

---

The present invention relates generally to automobile accessories and is a continuation-in-part of our copending United States patent application, entitled, "Windshield Cleaning Apparatus," filed May 24, 1965, Ser. No. 458,216 and now abandoned.

It is a general object of the present invention to provide means to condense water from the combustion products (i.e., exhaust) of a combustion engine of an automobile and to apply this water through dispensing means which cooperate with other components in an especially effective manner to accomplish auxiliary functions in the operation of the automobile. It is a further object that the water be condensed in an especially advantageous manner to accomplish these desired ends, and more particularly that this water be condensed by means which work in combination with conventional automobile components in a very advantageous manner.

One part of this invention is directed particularly to an automobile windshield washing device, and another part to an apparatus for air conditioning the passenger compartment of an automobile. For an orderly presentation of the present invention, there will first be a general discussion of prior art windshield washers and a presentation of the objects of the present invention which relate particularly to the windshield washing apparatus of the present invention. Then there will be a discussion of prior art automobile air conditioning devices, followed by the objects of the present invention which relate particularly to the automobile air conditioning apparatus of the present invention. After this, there follows the description of the figures of the accompanying drawings, and then the various embodiments of the present invention will be described in some detail.

Devices are well known in the prior art for spraying water or some other cleaning liquid onto the windshield of an automobile. These generally comprise a container for the liquid supply (i.e., a reservoir), one or more nozzles (usually a pair of nozzles) to direct the liquid to both sides of the windshield, and a pump to take the liquid from the reservoir and force it under adequate pressure through the nozzles onto the windshield. The windshield is best cleaned by operating the windshield wipers in conjunction with the spraying of the liquid, so the actuating knob or button for the washing device is usually located adjacent to, or possibly concentric with, that of the windshield washer, or a single control means is provided to operate both washer and wiper.

The obvious convenience of such devices is, naturally, that simply by operating the actuating means the windshield can be cleaned, regardless of whether the vehicle is traveling or stationary. With the greatly increasing use of such windshield cleaning devices over the past two decades or so, a good deal of creative effort has been directed to improving their effectiveness and also their convenience of operation. For example, different kinds of pumps, discharge nozzles and even reservoirs have been devised. Also since the driver most often wishes to operate the washer and wiper while the car is traveling, means have been devised where movement of only one switch or control knob will not only turn on both the washer and wiper but will coordinate the operation of the two in some manner.

Yet these various windshield cleaning devices are not without their shortcomings. For example, the reservoir as a practical matter is limited in the amount of liquid it can hold, and if conditions are encountered where frequent use of the washer is required, the supply of liquid in the reservoir is soon exhausted. Some consideration has been given to this problem in the creation of prior art devices, but the approach has generally been to utilize the liquid available in a more efficient manner so that the available cleaning liquid will not be dissipated as rapidly. For example, various devices have been proposed to discharge the liquid onto the windshield in intermittent bursts in timed relationship with the movement of the wipers, one advantage of this being that the liquid is not wastefully squirted onto the wiper blades. Another approach has been to discharge the liquid always just in front of the wiper blades so that the wiping step follows immediately after the washing. And some of the devices which coordinate the timing of the turning on of the windshield washer and wiper have purported to aid in this more effective use of the cleaning liquid.

Another source of difficulty has been the cold weather operation of windshield washers. In warm weather, water is usually used as the cleaning liquid, while to the best knowledge of the applicants herein, the windshield washers which are now commercially available require for cold weather operation a cleaning liquid having a freezing point lower than the temperature encountered in such weather. Unfortunately, most motorists do not ordinarily give to the windshield washer of the car the same attention that they give to its power plant in preparing the car for cold weather operation, with the result that filling the windshield cleaner with a suitable low freezing cleaning liquid often remains an uninitiated afterthought. On top of this, in a good many climates, it often happens that the windshield washer is of most value to the motorist and is used with greatest frequency during a winter or spring thaw, when the rising temperature makes a person less conscious of cold weather precautions. Thus the driver will often succumb to the temptation of averting the expense (and quite often the inconvenience) of using a lower freezing cleaning liquid and uses water as the cleaning liquid. Far too often a subsequent overnight drop in temperature will freeze up the cleaning unit to make it inoperable for a period even after the surrounding temperature has risen to above freezing, and sometimes damage parts of the unit in which the water remains.

In view of the foregoing considerations, it is an object of the present invention to provide a windshield washing device which in combination with a conventional automotive vehicle having a combustion engine, operates in such a manner as to alleviate the inconvenience of having to replenish the supply of cleaning liquid.

It is another object to provide a windshield washing device which in combination with a conventional automotive vehicle will operate in freezing weather without requiring the use of a low freezing cleaning liquid.

It may be stated as another object to provide for an automotive vehicle an especially convenient year-around windshield washing device which will operate reliably for an indefinite period of time without need of periodic refilling and without requiring special attention for either warm or cold weather operation.

It is a more particular object to provide such a device in which liquid water is available for cleaning in a relatively short time after the vehicle is started up, regardless of whether the outside temperature is well below the freezing temperature of water.

It is a further particular object that various components of many prior art windshield cleaning devices can be utilized in the present invention with little or no modification thereof.

It is yet another particular object that the heat exchange system by which the engine of the automotive vehicle is cooled is used in such a manner that it not only condenses water from the exhaust of the vehicle, but insures that liquid water of the desired temperature is available for cleaning soon after starting the vehicle.

Another automobile accessory that has become increasingly popular in recent years is air conditioners which cool the air for the passenger compartment of the automobile. Air conditioning apparatus has, of course, been used for a good many years in homes and in office and industrial biuldings; and over the years the general state of the air conditioning art has reached a rather sophisticated stage of development. However, there are still particular problems involved in providing a practical air conditioning system for an automobile, and while these certainly have not prevented altogether the use of air conditioners in automobiles, these problems have kept them out of the category of more or less standard items (such as automobile heaters), and more in the class of "luxury" items for the car.

To enlarge upon this, the design of present day automobiles puts a high premium on space, and most of the somewhat bulky and cumbersome units which are designed for use other than in automobiles but are classified as "portable" do not readily lend themselves to being installed in automobiles. This is especially problematical in view of the fact that an automobile air conditioning unit must have a relatively high capacity to be able quickly to cool the passenger compartment down to a comfortable level in a short time. Then there is the constantly changing environment under which the automobile air conditioning unit must operate. At one time the car will be traveling at high speeds so that there is a high power output from the engine to power the air conditioning unit, and the car has a high relative air velocity which can be utilized effectively to dissipate heat from the air conditioning system. Then at another time the car will be idling at a standstill or traveling at slow speeds in congested traffic, with low power output from the engine and low relative air velocity, and paradoxically it is in these circumstances that passenger discomfort from heat is often more severe and the air conditioning system should be functioning at its highest rate of output.

The overall result has been that most present day automobile air conditioning systems are compact, high-performance units that are relatively expensive, not only with respect to their original cost but also as to maintenance requirements. Generally these units comprise a compressor, located adjacent to and driven from the drive shaft of an automobile engine, which compressor, as its name implies, acts to compress a refrigerating medium which is then directed to a condenser. This condenser is mounted at the front end of the automobile (often just in front of the automobile radiator), where it can readily dissipate its heat to the air drawn therethrough by the radiator fan. From the condenser, the refrigerating medium passes to a collector and then through an expansion valve (where it experiences a drop in pressure and a corresponding decrease in temperature), then through an evaporator and back to the compressor. Air for the automobile passenger compartment is cooled by being moved through the evaporator so as to be in heat exchange relationship therewith.

There are some further particular problems associated with this type of air conditioning unit. For example, to obtain the output required for adequate cooling, it is necessary to have a system which can compress the refrigerating medium up to a pressure of perhaps several hundred pounds per square inch and of course handle the refrigerating medium at such pressures. This requires somewhat expensive equipment and even then the system is quite susceptible to the occurrence of leaks, especially where during the winter months the car owner sometimes permits the air conditioning system to remain idle for long periods with no circulation of the refrigerating medium through the system. Also the system must be arranged so that its compressor can operate at full capacity or near full capacity when the engine is idling. This necessitates some sort of clutch device to disengage the compressor at higher speeds and/or some by-pass arrangement so that the refrigerant is not traveling its full refrigerating cycle when it is not required to do so. Another source of difficulty is providing for the system proper thermostatic controls which will operate properly under the widely varying conditions to which the air conditioning system can be expected to be subjected. Yet another problem has been that with the condenser being immediately in front of the automobile radiator, the air passing through the radiator is in effect pre-heated by the condenser so as to detract from the proper operation of the engine cooling system of the automobile.

Other types of automobile air conditioners have been proposed. Some utilize ice (frozen water) or Dry Ice for cooling, and there are some which employ various refrigerating cycles. But to the best knowledge of the applicants herein, none of these have been adopted to any significant extent, except for a relatively simple and inexpensive water evaporating unit which comprises a tank that provides water for an associated evaporating pad. Such units are often portably mounted adacent to the window of the car and have a forwardly extending air scoop that collects air by virtue of the forward motion of the car, and directs this air through the evaporating pad into the passenger compartment. One obvious disadvantage of this type of device is, of course, that since there are practical limits to the size of the water tank, there is the inconvenience of periodically having to refill the tank. However, the inexpensiveness and simplicity of these units have given them some degree of popularity, especially in areas of the United States where there is a drier climate, which makes this type of evaporative cooler more effective.

The general principles of evaporative cooling (i.e., obtaining a cooling effect by dissipating heat through the evaporation of water) have long been known, and evaporative cooling has for a good number of years been used in a variety of applications, for example in air conditioners for buildings and the like. There have been various types of direct and indirect evaporative coolers, and each of these has certain advantages and disadvantages. For example a disadvantage of some of the indirect evaporative cooling devices is that as the water evaporates, because of minerals dissolved in the water scaling forms on the heat exchange surfaces so as to impede the rate of heat transfer therethrough. And then the effectiveness of most of the evaporative coolers depends to a greater or lesser degree on the conditions of the ambient atmosphere (particularly humidity). At any rate although it has been attempted to adapt some of these evaporative coolers for use in automobiles, to the best knowledge of the applicants herein, none of these water evaporative devices (aside possibly from the one described previously herein)

has achieved any significant degree of commercial success.

Thus it is also an object of the present invention to provide for an automobile having a combustion engine, water evaporating air conditioning apparatus which cooperates with the components of said automobile in an especially effective manner to accomplish its air conditioning function in an especially effective manner.

It can be stated as another object of the present invention to provide such air conditioning apparatus which keeps replenishing its water supply without the need of periodically obtaining water from an outside source, and which provides water especially well adapted for use in evaporative air conditioning.

It is a more particular object according to a preferred embodiment or embodiments of the present invention to provide apparatus which cooperates very effectively with the automobile heat exchange system whose conventional function is to cool the automobile engine, in such a manner as to accomplish the cooling of the passenger compartment without detracting to an excessive extent from the function of said heat exchange system of cooling the automobile engine.

It may be stated as an additional object or objects to provide in a practical manner various embodiments of such apparatus, each of which, according to its particular mode of operation, is especially advantageous in certain respects in performing its intended function in cooperation with the various conventional structural and operating components of the automobile. Rather than enumerate the same at this time, some of these will be expressly indicated in the description of these various embodiments, and others will at least become readily apparent therefrom.

These and other objects and features of the invention will be more readily understood and appreciated from the following detailed description of the preferred embodiments thereof selected for purposes of illustration and shown in the accompanying drawings.

In general, FIGS. 1 through 5 illustrate that part of the present invention directed to windshield washing apparatus, while FIGS. 6 through 15 illustrate that part of the invention directed to air conditioning apparatus.

FIGURE 1 is a perspective drawing of a conventional automobile utilizing windshield washing apparatus of the present invention;

FIG. 4 is a view, taken generally in vertical section, of a second windshield washing embodiment of the present invention;

FIG. 5 is a view taken on line 5—5 of FIG. 4;

FIG. 6 is a perspective drawing of a conventional automobile utilizing apparatus of a first embodiment of the air conditioning apparatus of the present invention;

FIG. 7 is a view taken generally in vertical section of the water condensing and associated apparatus of the embodiment shown in FIG. 6;

FIG. 8 is a front elevational view of the heat dissipating radiator shown in FIG. 6 and located at the front end of the automobile;

FIG. 8A is an enlarged fragmentary view of the upper left corner portion of the radiator of FIG. 8;

FIG. 9 is a side elevational view, with portions shown in section, of the air cooling portion of the apparatus of the embodiment of FIG. 6;

FIG. 10 is a side elevational view, with portions shown in section, of a second embodiment of the air conditioning apparatus of the present invention;

FIG. 11 is a semi-schematic view, taken generally in side elevation, of a third embodiment of the air conditioning apparatus of the present invention;

FIG. 12 is a semi-schematic view, also taken generally in side elevation, of yet a fourth embodiment of the air conditioning apparatus of the present invention, with FIG. 12A being an enlarged fragmentary view of that portion of FIG. 12 indicated at 12A;

FIG. 13 is a semi-schematic top plan view of a fifth embodiment of the air conditioning apparatus of the present invention;

FIG. 14 is a view taken from the location of line 14—14 of FIG. 13, and

FIG. 15 is a rear view taken from the location of line 15—15 of FIG. 13.

Figure 3:
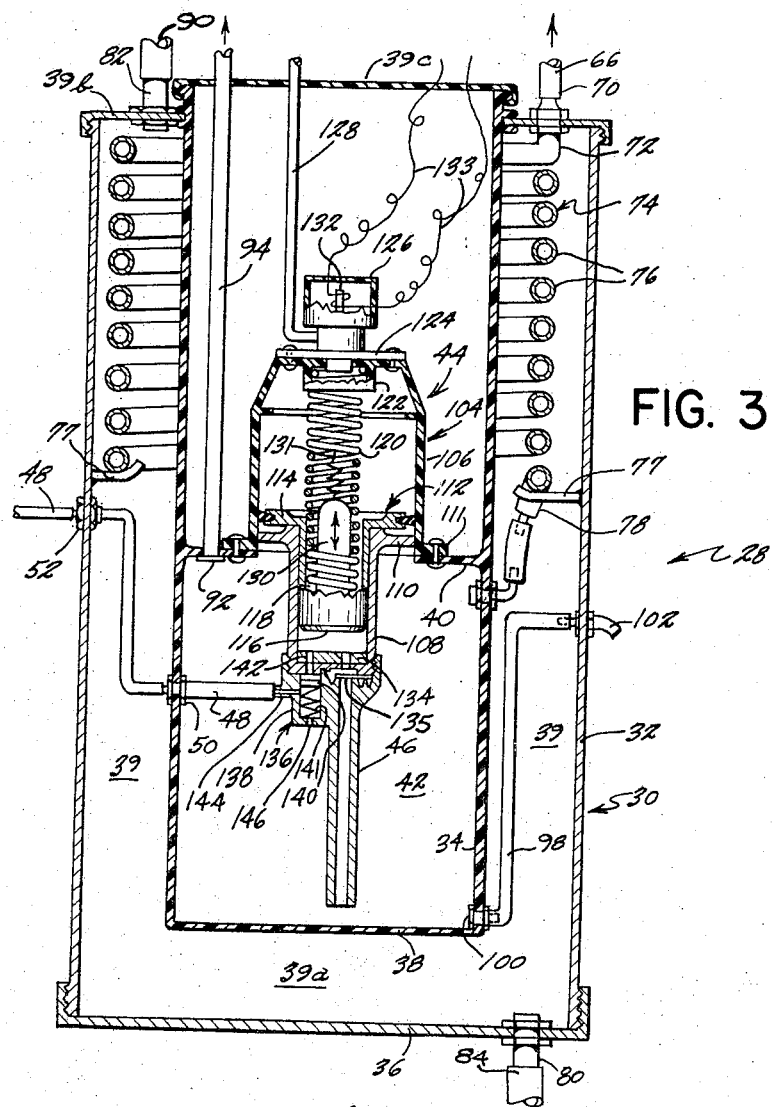
FIG. 3 is a sectional view thereof taken on line 3—3 of FIG. 2, and drawn on an enlarged scale.

Those embodiments of the present invention that relate to windshield washing will now be described.

In FIGURE 1 is illustrated an automobile 10 of conventional design, having for its power plant a gasoline burning internal combustion engine 12. The combustion products (i.e., exhaust) from the engine 12 pass through an exhaust manifold 14 into an exhaust pipe 16 which discharges the exhaust into the atmosphere at the rear of the automobile. Shown schematically at 18 is an after-burner through which the exhaust from the manifold 14 passes before going into the exhaust pipe 16, this after-burner 18 serving its usual function of insuring substantially complete combustion of the engine exhaust and thus producing cleaner combustion products. Such after-burners most commonly utilize a catalyst and/or pump or suck in air to aid in completing the combustion of any partially burned matter of the exhaust.

The automobile 10 is shown with a conventional liquid circulating heat exchange system whose main function is to cool the engine 12, and which comprises a pump 20 to circulate the liquid heat exchange medium (usually water with or without anti-freeze) through the block of the engine 12 to absorb heat therefrom, and to dissipate this heat through a radiator 22 mounted at the front of the automobile 10, with a fan 24 provided to draw air through the radiator 22 and thus increase the rate of heat dissipation. As is the usual practice, there is provided a thermostat (indicated schematically at 26) which regulates the flow of liquid through the radiator 22 so that the liquid is maintained at a desired operating temperature. Other conventional components of the automobile 10 are shown in rough outline in FIGURE 1 and are readily identifiable from a cursory examination of FIGURE 1.

Figure 2:
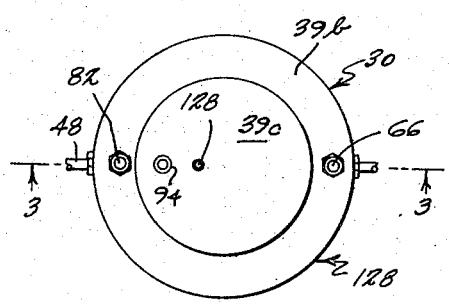
FIG. 2 is a fragmentary top plan view of the pump and reservoir unit of a first embodiment of the present invention.

There is provided a pump and reservoir unit 28 which, as illustrated herein, is mounted in front of, and proximate to the lower part of, the firewall 29 of the automobile 10. This unit 28 is shown in detail in FIGS. 2 and 3, and can be seen to comprise a water jacket 30 made up of outer and inner concentric cylindrical walls 32 and 34, respectively, with a lower or outer base plate 36 threaded onto and closing the bottom of the cylindrical outer wall 32, and a second inner base plate 38, spaced upwardly from the plate 36 and performing the same function with respect to the inner wall 34. The annular space 39 between the walls 32 and 34 and the space 39a between the base plates 36 and 38 comprises a heat exchange chamber of the jacket 30. The top of the chamber 39 is closed by an annular plate 39b, while a cap 39c covers the top end of the inner cylindrical wall 34.

At about the mid-height of the inner cylindrical wall 34 and secured to or integral therewith, is a horizontally disposed, inwardly extending annular flange 40, which, along with the inner base plate 38 and that portion of the cylindrical inner wall 34 disposed between the plate 38 and the flange 40, defines a reservoir 42. Mounted to this flange 40 and within the jacket 30 is a pump 44 having an intake line 46 extending into the reservoir 42 and opening at the lower end thereof. Leading from the lower end of the pump 44 is a discharge line 48 which reaches at 50 into the jacket 30 (i.e., into the annular space 39 between the walls 32 and 34) and upwardly therein a moderate distance to extend out through the outer wall 32, as at 52. This discharge line 48 then leads to a T fitting 54 (see FIG. 1) where it branches into two lines 56 and 58, each of which connects to a respective one of two nozzles 60 and 62 disposed to discharge cleaning liquid onto the automobile windshield 64.

There is an exhust intake line 66, one end 68 of which connects to the exhaust pipe 16 at a location immediately behind the after-burner 18, and the other end 70 of which connects to the inlet end 72 of a condensing coil 74. This inlet end 72 of the coil 74 is at the upper end of the jacket 30, and this coil 74 is arranged in a plurality of gradually descending convolutions 76 located within the upper portion of the annular space 39 between walls 32 and 34 and moderately spaced one from another. This coil 74 is supported from brackets 77, and the outlet end 78 of the coil 74 reaches through the inner wall 34 of the jacket 30 and terminates in the upper end of the reservoir 42.

So that the automobile's heat exchange medium (as indicated earlier, usually water or water with anti-freeze) can be circulated through the jacket 30, there is an inlet 80 and an outlet 82 at, respectively, the lower and upper ends of the jacket 30. The inlet 80 is connected to a higher pressure part of the circulating path of the automobile heat exchange system, while the outlet 82 is connected to a lower pressure part. In the arrangement shown herein, this is conveniently accomplished by connecting an inlet hose 84 from the intake hose 86 of a conventional hot water heater 88 of the automobile to the jacket inlet 80, and connecting an outlet hose 90 from the jacket outlet 82 to the return line 92 of the heater 88.

Leading from the upper part of the reservoir 42 (and as shown herein connected to the flange 40) is the inlet end 92 of an exhaust return line 94, whose outlet end 96 connects to the main exhaust line 16 at a location downstream of the location at which the exhaust intake line 66 connects to the main exhaust line 16 of the automobile. (If desired, the outlet end 96 of the return line 94 can discharge at a location further rearward than that shown in FIG. 1, thus increasing the pressure drop of the exhaust portion traveling through the line 66, the coil 74 and the line 94, and consequently increasing the flow of exhaust therethrough.) Leading from the lower end of the reservoir 42 is an overflow line 98. This line 98 connects at 100 to the lower end of the inner cylinder 34 and extends upwardly within the annular space 39 of the jacket 30 and then reaches outwardly through the outer jacket wall 32 where its discharge end is located at 102 at a predetermined height which is the desired maximum level of water in the reservoir 42, this being lower than the location 52 at which line 48 reaches out of the jacket 30.

The aforementioned pump 44 is or may be of a type similar to many of those now commercially available. The particular pump 44 shown herein comprises a housing 104 having an upper portion 106 defining a cylinder of larger diameter, and a lower portion 108 defining a cylinder of smaller diameter. The two cylinder portions 106 and 108 are connected by an annular shoulder portion 110, and at the lower end of housing portion 106 is an outwardly extending annular flange 111 by which the pump housing 104 is mounted to the aforementioned flange 40, with the lower housing portion 108 extending a moderate distance into the reservoir 42.

Within the housing 104 is a piston member 112 comprising an upper larger piston portion 114 and a lower smaller piston portion 116, which are mounted for slide movement within, respectively, the upper and lower cylinder portions 106 and 108. The two pistons 114 and 116 are fixedly connected one to another by a sleeve member 118 in which is seated the lower end of a compression spring 120, the upper end of which bears against a seat 122 in a top wall 124 of the housing 104.

Mounted to this wall 124 is a pump actuating mechanism which is shown only schematically at 126. This mechanism 126 serves the function of connecting the upper part of the upper cylinder portion 106 to a low pressure source (shown herein as a hose 128 leading to the intake manifold of the automobile), so that the piston member 112 is caused to be drawn upwardly within the housing 104 against the urging of the spring 120. The piston member 112 is provided with an upstanding valve actuating member 130, which, when the piston member 112 reaches a predetermined upper extent of travel, engages with a spring 131 a valve in the pump actuating mechanism to close the cylinder portion 106 from the low pressure source and to open it to atmospheric pressure. This permits the compression spring 120 to move the piston member 112 downwardly to its initial down position. (The details of the pump actuating mechanism 126 are not shown herein since it can be one of several types known in the prior art, such as the one shown in United States Patent No. 3,068,506 to Oishei. However, since that particular one happens to have a solenoid to initiate the pumping stroke, there is shown a solenoid 132 and a pair of lead wires 133 which can be connected to a suitable voltage source within the automobile.)

The normal position of the piston member 112 is in a down position with the two pistons 114 and 116 at the lower end of their respective cylinders 106 and 108. In one operating cycle, the piston member 112 first moves upwardly to draw water through the line 46 into the lower cylinder 108 from the reservoir 42, and then moves downwardly to discharge the water in the lower cylinder 108 through the discharge line 48. The intake line 46 leads into the lower end wall 134 of the cylinder 108 through a one-way valve 135 which permits flow from the intake line 46 into the cylinder 108 but prevents any return flow.

The aforementioned discharge line 48 also connects to the lower end of the cylinder 108 and is provided with a valve 136 which permits flow into the line 48 from the cylinder 108. However the valve 136 is such that although it prevents return flow into the cylinder 108, it does permit return flow back into the reservoir 42. This valve 136 comprises a cylinder 138 in which is a piston 140 urged by a spring 141 with moderate pressure upwardly in the cylinder 138. The cylinder 138 has a top opening 142 leading to the cylinder 108, a side opening 144 leading to the discharge line 48, and a bottom opening 146 leading to the reservoir 42. With the piston 140 in its normal up position, the openings 144 and 146 communicate with each other and water is free to flow from the discharge line 48 into the reservoir 42. However, when water in the cylinder 108 is under pressure from the piston 116, the valve piston 140 is pushed downwardly to cause the cylinder 108 to be in communication with the discharge line 48 and permit the water to be discharged from the cylinder 108 through the discharge line 48 and out the discharge nozzles 60 and 62. At the completion of the discharge stroke, the valve piston 140 returns to its up position to permit water in the lines 50, 54 and 56 to flow back into the reservoir 42. (This piston 140 has a moderately loose fit in the cylinder 138 to permit slow leakage of water around the piston 140.)

In operation, when the automobile engine 12 is running, the exhaust therefrom passes through the exhaust manifold 14, thence through the after-burner 18 and into the exhaust pipe 16, with a portion of this exhaust passing through the exhaust intake line 66 into the condensing coil 74. At the same time the pump 20 of the automobile heat exchange system is circulating the liquid heat exchange medium through the engine 12 and through the radiator 22, as well as through the jacket 30. During normal operation of the engine 12 (i.e., after the engine 12 is warmed up), the thermostat 26 controls the rate of flow to keep the liquid heat exchange medium at the desired temperature (usually about 140° or 160° F.). The liquid heat exchange medium passing through the annular space 39 of the jacket 30 cools the exhaust in the coil 74 to condense moisture therefrom. This condensed moisture flows from the outlet end 78 of the coil 74 and collects in the reservoir 42, while the remaining exhaust gases in the coil 74 pass through the upper part of the reservoir 42 into the exhaust return line 94 and back to the main exhaust pipe 16. Thus the water supply in the reservoir 42 is constantly being replenished, while the overflow line 98 keeps the water in the reservoir 42 below a predetermined level.

When it is desired to clean the automobile windshield 64, the pump 44 is operated in the aforedescribed manner. That is to say, the solenoid 132 is actuated to cause the piston member 112 to move upwardly and draw a charge of water from the reservoir 42 into the cylinder 108, after which the piston member 112 moves downwardly so that the piston portion 116 pushes the water in the cylinder 108 through the line 48 and thence through the lines 56 and 58 and out the nozzles 60 and 62. At the completion of the discharge stroke of the piston member 112, the piston member 140 of the valve 136 rises to permit the water remaining in the lines 54, 56 and 48 to flow back to the reservoir 42.

When the automobile 10 is operated in cold weather, the liquid heat exchange medium attains a temperature well above the freezing point of water soon after the engine 12 is started, and as this liquid heat exchange medium passes through the space 39a and the lower part of the space 39, it heats whatever water is in the reservoir 42 to melt this water, if it happens to be frozen, and warm it to a desired temperature. As before indicated, the valve 136 is such that the water in the lines 48, 54 and 56 drains back to the reservoir 42 after each operation of the pump 44 to prevent these lines 48, 54 and 56 from being frozen shut. Naturally, the inner wall 34 and base wall 38 and the other components which may have water standing in or about them for any period of time are made of material (e.g., a suitable plastic) which will yield sufficiently to prevent breaking of the same in the event of freezing.

A second embodiment of the present invention is illustrated in FIGS. 4 and 5. This second embodiment is especially adapted for cold weather operation, in that even if all the available water in the unit becomes frozen during a period when the automobile is not being used, a supply of water will quickly become available for cleaning the windshield soon after the engine of the automobile is started. The apparatus of the second embodiment is arranged with the various components of the automobile in somewhat the same manner as the apparatus of the first embodiment. Hence, this arrangement will not be described in any detail in this description of the second embodiment since it is evident from the description of the first embodiment, and when reference is hereafter made to such automobile components, the same numerical designations will be used as in the description of the first embodiment.

The unit of the second embodiment is designated 160 and is mounted in an automobile 10 in generally the same manner as the aforedescribed unit 28. This unit 160 comprises a tank 162 having a box-like configuration and comprising a bottom wall 164, side walls 166 and a top cover 168. The liquid heat exchange medium of the automobile is fed into the lower end of the tank at 170, and passes through the chamber 171 defined by the tank 162 and out the top end thereof at 172.

Mounted within the tank 162 is a first larger reservoir or container 174 and a second smaller reservoir or container 176. The larger reservoir 174 is closed and has four side walls 178, a top cover 180 and a slanting flat bottom wall 182. The smaller reservoir 176 is also closed and has the overall configuration of a shallow box standing on its end, and has two side walls 184, each of which has a relatively large surface area and spaced just a short distance one from another. Thus any liquid which is frozen in the small container 176 will soon thaw out because of the large heat transfer area of the two walls 184 and the relatively small volume of the container 176.

Located in the upper part of the tank 162 is a condensing coil 186, the upper intake end 188 of which connects to the exhaust pipe 16 of the automobile. Near the lower exit 190 end of the coil 186 there is an outlet fitting 192 which leads downwardly from the coil 186 through a tube 194 to an upper inlet opening 196 of the smaller reservoir 176, while the exit end 190 of the coil 186 opens to the upper end of the larger reservoir 174. Thus water that is condensed in the coil 186 will first flow through the outlet fitting 192 to fill up the smaller reservoir 176 and will then begin flowing from the coil outlet end 190 into the larger reservoir 174, until it flows out an over-flow pipe 198 provided for the reservoir 174. There is a line 200 leading from the upper end of the larger reservoir 174 to the main exhaust pipe 16 of the automobile at a location downstream of the place on the exhaust pipe 16 at which exhaust is diverted to the coil 186, so that the rest of the exhaust gases moving through the coil 186 pass back to the main exhaust pipe 16 of the automobile through the line 198.

Located below both the reservoirs 174 and 176 is a pump 202 mounted from a bracket 203 and comprising a housing 204, the front portion 206 of which is relatively stiff, and the rear portion 208 of which is relatively flexible and yet resilient. Connected to the rear portion 208 is an actuating rod 210 which is reciprocated by suitable power means (e.g., a solenoid or a manual lever) indicated schematically at 212. Leading from the front end of the housing 204 is a discharge line 214 which connects to suitable discharge nozzles proximate the windshield 64 of the automobile 10. Two other lines 216 and 218 lead from the bottom ends of, respectively, the reservoirs 174 and 176, through respective one way flap valves 220 and 222 into the chamber 224 defined by the housing 204.

In describing the operation of this second embodiment let it first be assumed that this unit 160 is operating in freezing weather. After the engine 12 of the automobile 10 is started up, the liquid heat exchange medium of the automobile 10 soon rises above the freezing temperature of water and begins to melt whatever water is present in the reservoirs 174 and 176, in the pump 202 and in the lines connecting to these components. The water in the lines, in the smaller reservoir 176 and in the pump 202 soon melts and thus a certain amount of water quickly becomes available for washing the windshield 64. When the pump housing 204 is compressed by an inward movement of the rod 210 (as shown in the broken lines of FIG. 4), water is discharged through the line 214. When the pump housing 204 returns to its normal expanded position (because of the resilience of the housing portion 208) the water remaining in the line 214 flows back into the pump housing 204, and additional water flows into the pump housing 204 from the reservoir 176 and/or from the reservoir 174. Thus the pump 202, by the nature of its operation incorporates a flow back feature.

Also, as soon as the engine 12 is started up, water is condensed from the exhaust traveling through the coil 186. Since the water condensed in the coil 186 first flows into the smaller reservoir 176 from the outlet fitting 192, this readily available source of water (i.e., the water in reservoir 176) is always quickly replenished. After this smaller reservoir 176 fills up, water condensed from the coil 186 begins to flow into the larger reservoir 174, which in the meantime is being melted (from the liquid heat transfer medium passing therearound) to be later available to the pump 202 through the line 216. With the bottom wall 182 of the reservoir 174 slanting from the horizontal, if at any time the liquid water in the reservoir 174 becomes exhausted and part of the water remains as ice, the ice will be wedged against the longer side wall 178 and the bottom wall 182 of the reservoir 174 to facilitate heat transfer therethrough and speed up the melting of the ice.

It will be noted that in both the first and second embodiments that thoses portions of the various lines which hold water when the pump of the unit is not being operated, are located within their units (either 28 or 160) so that the water remaining therein will soon melt after the engine is started. Thus in the first embodiment the discharge line 48 reaches out from the jacket 30 at a level above that at which water stands in the line 48, and the same arrangement is present in the unit 160 of the second embodiment.

Those embodiments of the present invention that relate to air conditioning the passenger compartment of an automobile will now be described.

With reference now to FIGS. 6 through 9, which show the first embodiment relating to air conditioning, there is shown in FIG. 6 an automobile 310 of conventional design, having for its power plant a gasoline internal combustion engine 312. The combustion products (i.e., exhaust) from the engine 312 pass through an exhaust manifold 314 into an exhaust pipe 316 which discharges the exhaust into the atmosphere at the rear of the automobile. Shown schematically at 318 is an afterburner through which the exhaust from the manifold 314 passes before going into the exhaust pipe 316, this after-burner 318 serving its usual function of insuring substantially complete combustion of the engine exhaust and thus producing cleaner combustion products. Such after-burners most commonly utilize a catalyst and/or pump or suck in air to aid in completing the combustion of any partially burned matter of the exhaust.

The automobile 310 is shown with a conventional liquid circulating heat exchange system whose main function is to cool the engine 312, and which comprises a pump 320 to circulate the liquid heat exchange medium (usually water with or without anti-freeze) through the block of the engine 312 to absorb heat therefrom, and to dissipate this heat through a radiator 322 mounted at the front of the automobile 310, with a fan 324 provided to draw air through the radiator 322 and thus increase the rate of heat dissipation. As is the usual practice, there is provided a thermostat (indicated schematically at 326) which regulates the flow of liquid through the radiator 322 so that the liquid is maintained at a desired operating temperature. Other conventional components of the automobile 310 are shown in rough outline in FIG. 6 and are readily identifiable from a cursory examination of FIG. 6.

There is provided a water condensing and reservoir unit 328 which, as illustrated herein, is mounted in front of, and proximate to the firewall 329 of the automobile 310. This unit 328 is shown in detail in FIG. 7 and can be seen to comprise a cylindrical container 330, mounted by a bracket 331 to the firewall 329, which cylinder 330 is closed by top and bottom covers 332 and 334, secured to the top and bottom ends, respectively, of the container 330, with the bottom cover having a drain plug 335. At about the mid-height of the container 330 is a horizontally disposed plate 336 which extends entirely across the interior of the container 330 and is secured thereto so as to divide the container 330 into an upper heat exchange water condensing chamber 338 and a lower reservoir 340.

There is an exhaust intake line 342, one end 344 of which connects to the exhaust pipe 316 at a location behind the after-burner 318, and the other end 346 of which connects to the inlet portion 348 of a condensing coil means 350. The inlet portion 348 of the condensing coil means 350 is at the upper end of the container 330. Since in the present embodiment, it may well be desired to condense a relatively high proportion of the water potentially available from the exhaust, the coil means 350 is formed as a plurality of tubular portions 352, each of which leads from the coil inlet 348 portion and descends gradually to terminate at a single coil outlet portion 354. For clarity of illustration, only one such coil 352 is shown entirely, but it is to be understood that the various coils 352 are arranged in moderately spaced relationship from one another to permit the desired heat exchange of exhaust in the coils 352 with the heat exchange medium in the heat exchange chamber 338. Thus these tubes 352 provide a plurality of paths arranged for parallel flow of the exhaust therethrough, so that a relatively high volume of exhaust can flow through the coil means 350 and so that the tubes 352 provide a large area of heat exchange surface. The coil outlet portion 354 of the coil means 350 reaches through the dividing plate 336 to terminate at the upper end of the reservoir 340.

So that the automobile's heat exchange medium (as indicated earlier, usually either water or water with anti-freeze) can be circulated through the heat exchange chamber 338 of the container 330, there is an inlet 358 and an outlet 360 at, respectively, the lower and upper ends of the heat exchange chamber 338. The inlet 358 is connected to a higher pressure part of the circulating path of the automobile's conventional heat exchange system, while the outlet 360 is connected to a lower pressure part. In the arrangement shown herein, this is accomplished by connecting an inlet hose 362 from the discharge end of the water pump 320 to the container inlet 358, and connecting an outlet hose 364 from the container outlet 360 to the intake end of the water pump 320.

Leading from the upper part of the reservoir 340 is the inlet end 366 of an exhaust return line 368, whose outlet end 369 connects to the main exhaust line 316 of the automobile at a location downstream of the location at which the inlet end 344 of the intake line 342 connects to the exhaust pipe 316. (If desired, the outlet end 369 of the exhaust return line 368 can discharge at a location further rearward than that shown in FIG. 6, thus increasing the pressure drop of the exhaust traveling through the intake line 342, the coil means 350, and the return line 368.) Valve means, such as that indicated schematically at 370, is provided to direct the exhaust from the after-burner 318 selectively through the main exhaust pipe 316 or through the exhaust inlet line 342, or through both in the desired proportion. In the schematic showing of FIG. 7, this valve 370 takes the form of a vane member 372 pivotally mounted at 374 at the juncture of the pipe 316 and line 342, in a manner that it can close one or the other of the same or partially close one or the other to the desired extent. A lever arm 376 is provided to operate the vane member 372, and if desired, this arm 376 can be connected (as by linkage 377) to a float 378 in the reservoir 340, in a manner that more or less exhaust is directed through the coil means 350, depending on whether the float 378 rides lower or higher, respectively, in the reservoir 340. Leading from the lower end of the reservoir 42 is an overflow line 380 which connects at 382 to the lower end of the container 330, and whose discharge end is located at 384 at a predetermined height which is the desired maximum level of water in the reservoir 340.

Also leading from the reservoir 340 is a water discharge line 386 provided with a shut-off and control valve indicated at 388. If desired, a float valve 390 can be provided to limit the flow of water out through the line 386 when the water is low in the reservoir 340. Such a valve is shown schematically in FIG. 7 as comprising a float 392 connected to an arm 394 pivotally mounted at 395 and connected to a flap 396 which will move toward a closing position over the inlet end 398 of the water discharge line 386 in response to lowering of the water in the reservoir 340.

In FIG. 6 is shown a pair of radiators 400 and 402 (i.e., heat exchange members), which are interconnected by a pair of lines 404 and 406 to provide for the flow therethrough of an air cooling heat exchange medium, e.g., water or some other liquid. The one radiator 400 is a heat dissipating radiator and is located so that outside air can be passed therethrough, while the second radiator 402 is a cooling radiator and is positioned so that air for the passenger compartment (either outside or recirculated air, or a combination of both) can be passed therethrough. In the particular arrangement illustrated in FIG. 6, the cooling radiator 402 is mounted in a housing 408 located on the right hand side of the car beneath the dashboard 410. At the discharge end (i.e., rearwardly facing end) of the housing 408 is a set of adjustable vents 412, while the other end (i.e., intake end) of the housing is formed so as to define a plenum chamber 414 which may, if desired, be provided with baffles 416 or other means to cause more uniform distribution of the air flow through all parts of the radiator 402.

There is an outside and an inside intake vent 418 and 420, respectively, which vents lead through respective conduits 422 and 424 to a single conduit 426, which in turn leads to the intake end of the housing 408. So that air can be drawn in from either intake vent 418 or 420, or from both in selected proportions, there is provided a valve 428 comprising a vane 430 pivotally mounted at 432 at the juncture of the conduits 422 and 424, and arranged so that it can be swung over to close either conduit 422 or 424, or be placed at a desired intermediate position. This vane 430 is connected to a control lever 434 which is in turn connected to a control cable 436 that can be manipulated from within the car (a control knob 438 being shown as a means of accomplishing this). For convenience, no attempt has been made to show how this particular air circulating system can be combined with or incorporated in various types of conventional air circulating apparatus of the automobile, but it is understood that air circulating apparatus could be provided which could serve other air circulating functions in addition to the particular air cooling function described herein.

To draw air from the vents 418 and 420, through the radiator 402 and out the set of vents 412 into the passenger compartment, there is provided a fan 440 positioned in front of the radiator 402. This fan 440 is driven through a belt drive 442 from an electric motor 444, which also drives a pump 446 to circulate the cooling medium through the radiators 400 and 402. Thus, the cooling medium flows from the pump 446 through the line 406 into the upper end of the radiator 400, and thence downwardly therethrough, then back through the line 404 to the upper part of the radiator 402 to flow downwardly therethrough and back to the pump 446. This motor 444 can be powered from the electrical power system of the automobile. In describing the various power consuming operating components of the various embodiments of the present invention, it is understood that these components would ordinarily be arranged so as to draw power ultimately from the automobile engine 312, but since the art of power transformation and transmission is well developed and well known in the automotive art, it is not believed to be necessary or especially helpful for an understanding of the present invention to discuss the same in any detail herein.

In the particular arrangement shown herein, the heat dissipating radiator 400 is located just in front of the conventional radiator 322 of the automobile 310 (which radiator 322, as indicated previously, serves its usual function of dissipating heat from the heat exchange medium used to cool the engine 312), so that the conventional radiator fan 324 as well as the forward motion of the automobile 310 causes a flow of outside air also through the radiator 400. This radiator 400 comprises a lower main portion 447 and an upper precooling portion 448. This lower main part 447 of this radiator 400 provides for the flow therethrough of the heat exchange medium for cooling the passenger compartment of the automobile 310, and comprises upper and lower generally horizontal tubular members 449 and 450 which are interconnected by a number of smaller, generally vertically disposed tubular members 452, which collectively form a relatively large heat exchange surface for the heat exchange medium passing therethrough. The air cooling heat exchange medium flows into the tubular portion 449, down through the tubes 452, into the portion 450 and out through the line 404. (These tubular members 452 are shown only somewhat semi-schematically, and in actual practice would probably be arranged in greater number and with more exposed surface area than in the arrangement shown herein. Also, with these radiators 400 and 402 as well as with the radiators of the other embodiments, fin members 453 can be provided to increase the effective heat exchange area.)

The upper part 448 of the radiator 400 comprises upper and lower tubular members 454 and 456, respectively, which also are interconnected by a number of vertically disposed tubular members 458. The upper tubular member 454 is formed with a few discharge openings 460, while the lower member 456 is formed with a greater number of such discharge openings 462. The entire radiator 400 is covered with an absorbent or wick-like material, indicated schematically at 464, which fits in a network over the various tubular members 449, 450, 452, 454, 456 and 458 and serves to cause the outside surfaces of these members to become better wetted and thus aids the evaporation of the water from these tubular members.

The aforementioned water discharge line 386 (i.e., that line leading from the reservoir 340) connects to the uppermost horizontal tubular member 454 of the radiator 400. Desirably, the reservoir 340 is located at a higher level than this tubular member 454 so that water will flow by gravity from the reservoir 340 to the member 454. (If not, pump means can be provided to feed the water to the member 454.) Some of the water in the upper member 454 will flow out through the upper openings 460 and into the wick material surrounding the upper radiator portion 448 to pre-cool the water flowing down the upper vertical tubular members 458 to the tubular member 456. The water which flows down through the tubes 458 into the horizontal tube 456 passes out through the openings 462 and passes down along the wick material 464 surrounding the lower vertical tubular members 452 to wet the same. This water evaporates to cool the tubular members 452, as well as the members 449 and 450, and thus cool the heat exchange medium passing through radiator 400.

The radiator 302 is of conventional design and is similar in construction to the lower main portion 447 of the radiator 400. Thus it comprises an upper horizontal tubular feeder member 466, a lower horizontal tubular collector member 468, and a number of vertical tubular heat exchange members 470 interconnecting the members 466 and 468. However, since no evaporation takes place on the radiator 402, no wick material is provided, and the air drawn through the radiator 402 by the fan 440 is cooled by passing through the tubular members 470 so as to be in heat exchange relationship therewith.

In operation, when the automobile engine 312 is running, the exhaust therefrom passes through the exhaust manifold 314, thence through the after-burner 318 and into the exhaust pipe 316, with a portion of this exhaust (depending upon the disposition of the valve 370) passing through the exhaust intake line 342 into the condensing coil means 350. At the same time the pump 320 of the automobile engine heat exchange system is circulating its liquid heat exchange medium through the engine 312, and through its radiator 322, as well as through the heat exchange chamber 338 of the container 330. During normal operation of the engine 312 (i.e., after the engine 312 is warmed up), the thermostat 326 controls the flow to keep the liquid heat exchange medium at the desired temperature (usually about 140° or 160° F.). The liquid heat exchange medium passing through the heat exchange chamber 338 of the container 330 cools the exhaust in the coil means 350 to condense moisture therefrom. The condensed moisture flows from the outlet portion 354 of the coil means 350 and collects in the reservoir 340, while the remaining exhaust gases in the coil means 350 pass through the upper part of the reservoir 340 into the exhaust return line 368 and back to the exhaust pipe 316. Thus the water in the reservoir 340 is constantly being replenished. If means are provided to control the amount of exhaust directed to the unit 330 in relation to the rate at which the water in the reservoir 340 is dissipated (such as the float arrangement indicated schematically at 378), the amount of water condensed will vary according to the rate at which this water is being dissipated, and the upper limit of the water level in the reservoir 340 will be controlled by the overflow pipe 380.

When it is desired to cool the passenger compartment of the automobile 310, the valve 388 is opened to permit water to flow from the reservoir 340 through the line 386 to the front radiator 400, where the water flows out over the surface of this radiator 400 in the aforedescribed manner to cool the heat exchange medium therein. The motor 444 is started to turn the fan 440 and to drive the pump 446 to circulate the air conditioning heat exchange medium through the front radiator 400 where it is cooled, back to the cooling radiator 402 where it absorbs heat from the air for the passenger compartment, and thence back to the radiator 400. The fan 440 draws air from either or both of the intake vents 418 and 420 (depending upon the disposition of the valve 428), through the radiator 402 where this air is cooled, and moves this air into the passenger compartment of the automobile 410. A greater or lesser degree of cooling can be obtained by operating the valve 388 to control the flow of evaporating water to the heat dissipating radiator 400, and/or by controlling the speed of the fan 440 and pump 446 by controlling the speed of the motor 444, the motor having a control lever 469 for this purpose.

When the automobile 310 is traveling at higher speeds, water can be condensed at a faster rate, not only because there is a greater volume of exhaust being discharged (and hence more moisture available), but also because at higher speeds there is usually a more rapid rate of air flow through the radiator 322 of the engine heat exchange system, and this radiator 322 is better able to dissipate to the surrounding atmosphere the heat it absorbs by virtue of being in heat exchange relationship with the exhaust in the condensing and reservoir unit 328. On the other hand, when the automobile 310 is moving slowly or is at a standstill with the engine 312 idling, this water previously condensed and stored in the reservoir 340 can now be evaporated perhaps at a greater rate than it is being replenished, to still maintain a good flow of cooling air into the car. It is to be noted that the air passing through the front water evaporating radiator 400 is cooled by the evaporating water and hence does not interfere with the engine heat exchange radiator 322 dissipating heat therefrom in its normal fashion. (It is understood, of course, that for certain considerations it may be more desirable to place this radiator 400 at another location and provide it with its own fan, so that there is a better controlled flow of evaporating air therethrough.)

Also it is to be noted that the water that is condensed from the exhaust and collected in the reservoir 340 is relatively pure in that it does not have minerals dissolved therein which can cause scales to form on the evaporating surfaces. (Such scales inhibit heat transfer through the evaporating surfaces and thus impair the proper operation of indirect evaporative cooling systems, such as the one just now described.)

A second embodiment of the air conditioning apparatus of the present invention is illustrated in FIG. 10. In describing this embodiment, components which are generally the same as components of the previous embodiment will be given like numerical designations, with an "a" suffix distinguishing those of this second embodiment.

In this second embodiment there is provided a condensing and reservoir unit 328a which cooperates with the conventional engine heat exchange system of the automobile in the same manner as in the previous embodiment to condense water from the engine exhaust and store it in its reservoir 340a. (For simplicity of illustration, the engine, exhaust manifold, afterburner, exhaust pipe, engine cooling radiator, water pump, radiator fan, and other conventional automobile components are not shown in FIG. 10, it being understood that such components are present in this second air conditioning embodiment as in the first air conditioning embodiment.) There is provided beneath the dashboard 410a of the automobile a housing 408a having at its rearwardly facing end discharge vents 412a. Vertically disposed and mounted transversely across the housing 408a is an evaporating pad 472. Extending along the top and lower edges of the pad 472 are, respectively, an upper water distributing trough 474 and a lower water collecting trough 476. Water from the reservoir 340a passes through its control valve 388a into the distributing trough 474, from which it passes through openings 478 in the bottom of the trough 474 down through the evaporating pad 472. That portion of the water which is not evaporated from the pad 472 is collected in the lower trough 476 and recycled by a pump 480 through a line 482 back to the distributing trough 474, with cooling water for the pad 472 constantly being replenished from the reservoir 340a.

Mounted by struts 484 within the housing 408a is a fan 440a driven by a belt 442a from a motor 444a, which can also supply power for the pump 80. Outside air is brought into the front end 486 of the housing 408a by a conduit 488 which opens to the outside atmosphere at a suitable location. This air is drawn through the evaporating pad 472 to become cooled by evaporating moisture from the pad 472, and this cooled air then passes through the vents 412a into the passenger compartment.

A third and fourth embodiment of the air conditioning apparatus are shown somewhat schematically in FIGS. 11 and 12, respectively. In describing each of these embodiments, components which are generally the same as components of the first embodiment of the air conditioning apparatus will be given like numerical designations, with a "b" suffix distinguishing those of the third embodiment and a "c" suffix distinguishing those of the fourth embodiment.

In the third embodiment shown in FIG. 11, there is, as in the first embodiment, an internal combustion engine 312b which discharges its exhaust through the exhaust manifold 314b, the after burner 318b, and out the exhaust pipe 316b. Also the engine 312b has a water pump 320b which circulates the engine heat exchange medium through the engine block and through the radiator 322b. There is a condensing and reservoir unit 328b which functions in the same manner as the unit 328 of the first embodiment of the air conditioning apparatus. That is to say, a portion of the engine exhaust is directed (by valve means not shown) through the unit 328b to condense water therefrom by losing heat to the engine heat exchange medium which the water pump 320b circulates through the unit 328b, and this heat is in turn dissipated to the surrounding atmosphere through the automobile radiator 322b.

As in the first air conditioning embodiment, there are a pair of air conditioning radiators 400b and 402b interconnected by lines 404b and 406b and provided with a pump 446b to circulate a heat exchange medium on a path through both the radiators 400b and 402b. Water from a reservoir 340b of the unit 328b is directed to the radiator 400b so as to be in evaporative heat exchange relationship therewith in the same manner as in the first air conditioning embodiment (i.e., the water being evaporated on the heat exchange surfaces of the radiator 400b so as to cool the heat exchange medium passing therethrough).

Air is drawn in through either an outside conduit 422b or an inside conduit 424b (or through both) into a collector conduit 426b at the intake end of a housing 408b containing the cooling radiator 402b. However instead of providing a fan to draw the air through the cooling radiator as in the first air conditioning embodiment there is provided at the intake end of the housing 408b a compressor, indicated schematically at 488, which takes the air from the conduit 426b and moves it under increased pressure into the housing 408b. The output of this compressor is controlled by a suitable control means indicated at 489. The increase in air pressure causes a corresponding increase in the temperature of this air within the housing 408b so as to increase the rate of transfer of heat from the air to the cooling radiator 402b.

The outlet end of the housing 408b is provided with suitable restricted outlet means, indicated schematically at 490, which permits the air in the housing 408b to move into the passenger compartment at a low enough volumetric rate so that the desired degree of pressure can be maintained in the housing 408b. This restricted outlet means 490 can be a member with one or more small openings and/or can provide a circuitous route for the air through one or more small passageways. As the air passes from the outlet means 490, it experiences a drop in pressure and also experiences a corresponding drop in temperature. Since some of the heat of each portion of discharged air has been lost to the heat exchange medium in the radiator 402b, the temperature of the air passing from the outlet means 490 into the passenger compartment is lower than it was before being taken into the compressor 488. The degree of cooling can conveniently be regulated by controlling the output of the compressor 488 and/or by controlling the flow of evaporating water through the valve 388b. Also by controlling the rate of flow through the outlet 490 (e.g., by varying the size of the discharge opening or openings therein), the degree of cooling can be controlled.

In the fourth air conditioning embodiment illustrated in FIGS. 12 and 12A, there is shown an engine 312c, exhaust manifold 314c, exhaust pipe 316c, after-burner 318c, water pump 320c, car radiator 322c, radiator fan 324C, thermostat 326c and a condensing and reservoir unit 328c, all of which function in substantially the same manner as their corresponding components of the previous air conditioning embodiments. To obtain the desired evaporative cooling effect there is provided a housing 408c, having discharge vents 412c on its rearwardly facing end and forming a plenum chamber 414c at its intake end. Extending transversely across the housing 408c at a location between the discharge vents 412c and plenum chamber 414c is an air cooling heat exchanger, generally designated 500. This heat exchanger 500 has a box-like construction and comprises front, rear, top, bottom and side walls, designated 502, 504, 506, 508 and 510, respectively, which walls are joined together to define an airtight evaporating chamber 512. A plurality of tubular pieces 514 reach from the front wall 502 to the rear wall 504, and each such tubular piece defines a respective through passage 516 reaching from the plenum chamber 414c and through the rear wall 504. Located in the housing 408c behind the heat exchanger 500 is a fan 440c to draw air from either or both of outside and inside intake conduits 422c and 424c through the passageways 516 in the heat exchanger 500 and out the vents 412c into the passenger compartment.

Water from the reservoir 340c flows through a line 386c into the evaporating chamber 512 through an opening 518 in the top portion of the front wall 502. A float valve (indicated schematically at 520 in FIG. 12A) having a closure flap 521 is provided to shut off water flow into the chamber 512 when the water therein rises to a predetermined level near the top of the chamber 512. Mounted on top of the housing 408c is a vacuum pump, shown schematically at 522, which functions to draw out from the chamber 512 the water vapor and whatever air is located in the upper portion of the chamber 512, and to discharge this water vapor and air either to the outside atmosphere or through a line 524 to the intake manifold of the engine 312c. In the event that the water vapor and air is discharged to the engine intake manifold, there are several advantages. Not only does the vacuum pump 522 work against less pressure head since there is a suction at the intake manifold, but water vapor is being injected into the engine to improve its performance. Also since this water vapor then comes out as engine exhaust, a part of which is again condensed in the unit 328c, the ability of the unit 328c to condense water is improved. Fin members (one of which is shown at 528), covered with water absorbent material, reach from below the water level into the upper part of the chamber 512, so as to present a sufficiently large evaporating surface for the water in the chamber 512.

The mode of operation of this fourth air conditioning embodiment should be readily understandable from the description above. Water condensed from the engine exhaust by the unit 328c is fed into the chamber 512, and the float valve 520 operates to keep the chamber 512 nearly filled with this water. The vacuum pump 522 draws out the air and water vapor in the chamber 512 to lower the pressure therein, with the result that water in the chamber 512 boils off to cool the water that remains in the chamber 512. The fan 440c draws air to be cooled through the heat exchange passages 516 defined by the tubes 514, and heat from this air passes to the tubes 514 and into the water in the chamber 512. However the pump 522 continues to keep the pressure in the chamber 512 at the desired level by drawing away the water that boils off, to keep the boiling point (and hence the temperature) of the water remaining in the chamber 512 at a level sufficiently low so that this water provides sufficient cooling for the air traveling through the heat exchange passageways 516. The degree of cooling can conveniently be controlled by varying the output of the vacuum pump through a related control lever 526, and/or controlling the speed of the fan 440c by a control lever 469c for the motor 444c that turns the fan 440c.

Yet a fifth air conditioning embodiment is illustrated somewhat schematically in FIGS. 13, 14 and 15. In describing this fifth embodiment, components which are generally the same as components of the previous air conditioning embodiments will be given like numerical designations, with a "d" suffix distinguishing those of the fifth embodiment. In this fifth embodiment, there is shown an engine 312d, exhaust manifold 314d, exhaust pipe 316d, after-burner 318d, water pump 320d, car radiator 322d, radiator fan 324d, thermostat 326d and a condensing and reservoir unit 328d, all of which function in substantially the same manner as their corresponding components of the previous air conditioning embodiments.

To obtain the desired evaporative cooling effect there is provided two stages of cooling, one or both of which can be utilized to obtain the desired cooling effect for the automobile passenger compartment. Thus, there is a heat exchange unit 600 comprising a first indirect evaporative cooling portion 602 and a second direct evaporative cooling portion 604. The indirect evaporative cooling portion comprises a housing 605, which is open at the sides and has a front and rear wall 606 and 608, respectively, between which extend a plurality of tubular members 610, each of which defines a related heat exchange through passage 612. The outside surface of each of these tubular members 610 is provided with a network of wick-like material (not shown for convenience of illustration) similar to that which covers the radiator 400 of the first air conditioning embodiment. Located above these tubular members 610 is a water dispensing device 614 (shown in FIG. 14) comprising an upper tubular member 616, a lower tubular member 618, and a number of vertical tubular members 620 which are covered with a wick-like material (not shown for convenience of illustration).

Water from the reservoir 340d flows through the line 386d into the upper tubular member 616, with part of this water flowing out through holes 622 in this upper member 616, and with the aid of the wick material surrounding the vertical members 620 wetting the outside surfaces of these members 620. The rest of the water flows downwardly through the vertical tubular members 620 into the lower member 618, from which the water flows out through a plurality of nozzles 624 to wet the wick material surrounding the aforementioned tubular members 610 and thus wet the outside surface of these members 610. A plurality of vertical fin members 625 reach between the tubes 610 to permit the water to flow down and wet the lower tubes 610 and to promote heat exchange from the tubes 610.

Leading from this lower tubular member 618 to an evaporating pad 626 located rearwardly of the tubular members 610, is a water line 628 having a control valve 630 to control flow of water from the member 618 through the line 628 to the pad 626. This pad 626 is mounted at the rear open end of a conduit-like housing 632 which reaches rearwardly from the rear wall 608 to define a short rearwardly extending passage leading from the rear end of the tube members 610 to the pad 626. This pad 626 is centrally located at the rear of the housing 632 so that this housing 632 defines two rear openings 633, one on each side of the pad 626. Three door-like vents are provided, one 634 covering the rear face of the evaporating pad 626, and the other two 636 covering a respective one of the two openings 633 on each side of the pad 626. By closing the middle vent 634 and opening the side vents 636, flow from the tubes 610 can be directed through the openings 633 that are on each side of the pad 626, while by closing the side vents 636 and opening the middle vent 634 air flow can be directed through the evaporating pad 626. Thus by selectively operating the valve 630 and selectively opening or closing these vents 634 and 636, the evaporative pad 626 can be used as desired as a second stage direct evaporative cooler.

Air is drawn from either or both of an outside and an inside conduit (for convenience of illustration only the outside conduit 422d and its associated intake vent 418d being shown) through the heat exchange passageways 612 within the tubes 610 and out one or more of the vents 634 and 636 into the passanger compartment, by means of a fan 638 mounted in the housing 632 between the evaporating pad 626 and the tubular members 610. A second fan 640 is positioned to one side of the heat exchange tubes 610 and draws outside air through an intake vent 642 and transversely through the housing 605 so that this air passes through the water dispensing device 614 and through the area occupied by the tubes 610 so as to pass around the outside surfaces of the tubes 610 and 620 to evaporate moisture therefrom and cool the same, this air being discharged to the outside atmosphere.

To describe the overall operation of this fifth embodiment, a motor 644 with a control switch 645 is turned on to operate both the fans 638 and 640 to circulate air for the passenger compartment through the tube passageways 612 and to circulate outside air around the outside surfaces of the tubes 610 and 620. The valve 388d is opened to feed evaporating water from the reservoir 340d to the water dispensing device 614, with part of the water flowing on the outside surface of this device to precool the water flowing through the vertical tubes 620 of the water dispensing device 614, and the rest of the water flowing out onto the heat exchange tubes 610. The air flowing through the passageways 612 within the tubes 610 is thus cooled by the evaporative action of the water on the outside surfaces of the tubes 610, and this air flows out the openings 633 into the passenger compartment. If it is desired to use the second stage of cooling, the valve 630 is opened to permit part of the water flowing from the water dispensing device 614 to be diverted to flow onto the evaporating pad 626, and the side vents 636 are closed while the middle vent 634 is opened to direct the flow of air from the passageways 612 through the pad 626, and thus further cool this air. As in the previous air conditioning embodiments, water is continuously replenished by the action of the unit 328d in cooperation with the other aforementioned components of the automobile. The degree of cooling can be controlled by changing the speed of the fans 638 and 640 by controlling the speed of the motor 644 through the control switch 645, and/or by controlling the flow of evaporating water to the unit 600 by means of the valve 386d.

It should be understood that the foregoing is merely illustrative of certain embodiments of the invention and many variations may be made by those skilled in the art without departing from the spirit and scope of the invention.

Now therefore we claim:

1. In combination with an automotive vehicle having a windshield and a combustion engine which discharges exhaust thereof along a predetermined exhaust path,
    (a) first heat exhange means to condense water from the exhaust of said engine,
    (b) exhaust directing means to receive at least a portion of said exhaust and direct said exhaust portion through said first heat exchange means, and to discharge what remains of said exhaust from said first heat exchange means,
    (c) a reservoir means disposed to receive the water from said first heat exchange means,
    (d) windshield spray means arranged to direct water onto said automobile windshield,
    (e) pump means operatively connected to said spray means and said reservoir so as to pump water from said reservoir through said spray means and onto said windshield, and
    (f) other heat exchange means in said automobile including means to impart heat to the water in said reservoir to bring said water to a desired temperature and means to absorb heat from said exhaust portion in said first heat exchange means so as to cause water to be condensed in said first heat exchange means.

2. The apparatus as recited in claim 1, wherein said automotive vehicle is provided with afterburner means, and said exhaust directing means receives said exhaust portion after it has passed through said afterburner means.

3. In combination with an automotive vehicle having a windshield, a combustion engine which discharges exhaust thereof along a predetermined exhaust path, and a heat exchange system which utilizes a liquid heat exchange medium and comprises radiator means, and also comprises liquid circulating means to circulate said liquid medium into heat exchange relationship with said engine so as to absorb heat therefrom and into heat exchange relationship with said radiator means where heat from said liquid medium is dissipated, said heat exchange system being such that the temperature of said liquid medium at a predetermined location in said system is, during the normal operating conditions of said engine, between the freezing point and boiling point of water,
    (a) heat exchange water condensing means to condense moisture from the exhaust of said engine,
    (b) exhaust directing means to receive at least a portion of said exhaust and direct said exhaust portion through said heat exchange water condensing means, and to discharge what remains of said exhaust from said heat exchange water condensing means,
    (c) a reservoir means to receive condensed water from said heat exchange water condensing means,
    (d) windshield spray means arranged to direct water onto said automobile windshield,
    (e) pump means operatively connected to said spray means and said reservoir so as to pump water from said reservoir through said spray means and onto said windshield,
    (f) other heat exchange means to direct at least a portion of said liquid heat exchange medium which in normal operation is at a temperature between the freezing and boiling point of water, into heat exchange relationship with said heat exchange water condensing means, and (g) said automobile having afterburner means which is disposed to receive exhaust from said engine and provide substantially complete combustion of said exhaust, and said exhaust directing means receiving said exhaust portion after said exhaust has passed through said afterburner means.

4. In combination with an automotive vehicle having a windshield, a combustion engine which discharges exhaust thereof along a predetermined exhaust path, and a heat exchange system which directs a heat exchange medium into heat exchange relationship with said engine so as to cool the same.

(a) heat exchange water condensing means to condense moisture from the exhaust of said engine, (b) afterburner means disposed to receive exhaust from said engine and provide substantially complete combustion of said exhaust, (c) exhaust directing means to direct at least a portion of the exhaust from said afterburner means to said heat exchange water condensing means, (d) other means to direct said heat exchange medium to said heat exchange condensing means and into heat exchange relationship with said portion of the exhaust, and (e) a reservoir means disposed to receive water from said heat exchange water condensing means, (f) windshield spray means arranged to direct water onto said automobile windshield, (g) pump means operatively connected to said spray means and said reservoir so as to pump water from said reservoir through said spray means and onto said windshield, and (h) said other means including means to bring said heat exchange medium into heat exchange relationship with said reservoir so as to cause heat exchange with water condensed from said exhaust so that said water is in a liquid condition.

5. The apparatus as recited in claim 4, wherein said apparatus is arranged with flow back means which causes water in said spray means to flow back from said spray means after operation of said pump means.

6. In combination with an automotive vehicle having a windshield, a combustion engine which discharges exhaust thereof along a predetermined exhaust path, and a heat exchange system which utilizes a liquid heat exchange medium and comprises radiator means, and also comprises liquid circulating means to circulate said liquid medium into heat exchange relationship with said engine so as to absorb heat therefrom and into heat exchange relationship with said radiator means where heat from said liquid medium is dissipated, said heat exchange system being such that the temperature of said liquid medium at a predetermined location in said system is, during the normal operating conditions of said engine, between the freezing point and boiling point of water, (a) heat exchange water condensing means to condense moisture from the exhaust of said engine, (b) exhaust directing means to receive at least a portion of said exhaust and direct said exhaust portion through said heat exchange water condensing means, and to discharge what remains of said exhaust from said heat exchange water condensing means, (c) a reservoir means to receive condensed water from said heat exchange water condensing means, (d) windshield spray means arranged to direct water onto said automobile windshield, (e) pump means operatively connected to said spray means and said reservoir so as to pump water from said reservoir through said spray means and onto said windshield, (f) other heat exchange means to direct at least a portion of said liquid heat exchange medium which in normal operation is at a temperature between the freezing and boiling point of water, into heat exchange relationship with said heat exchange water condensing means and into heat exchange relationship with water condensed from said heat exchange water condensing means, and (g) said other heat exchange means comprising chamber means through which said liquid heat exchange medium flows, and both said heat exchange water condensing means and said reservoir means being disposed in heat exchange relationship with said chamber means.

7. The apparatus as recited in claim 6, wherein said heat exchange water condensing means comprises coil means disposed in said chamber means.

8. The apparatus as recited in claim 7, wherein said coil means is disposed above said reservoir means and has a lower outlet end to discharge moisture condensed in said coil means into said reservoir means.

9. The apparatus as recited in claim 6, wherein said reservoir means comprises a larger and a smaller reservoir, both of which communicate with said pump means, said smaller reservoir having a relatively large heat transfer area with respect to the volume thereof.

10. The apparatus as recited in claim 9, wherein said heat exchange water condensing means is provided with outlet means so arranged that moisture condensed in said heat exchange water condensing means is first directed to said smaller reservoir and then to said larger reservoir after said smaller reservoir is filled to a predetermined level.

11. The apparatus as recited in claim 10 wherein said pump means is disposed in said chamber means so as to be in heat exchange relationship with said liquid heat exchange medium.

12. In combination with an automotive vehicle having a windshield, a combustion engine which discharges exhaust thereof along a predetermined exhaust path, and a heat exchange system which utilizes a liquid heat exchange medium and comprises radiator means, and also comprises liquid circulating means to circulate said liquid medium into heat exchange relationship with said engine so as to absorb heat therefrom and into heat exchange relationship with said radiator means where heat from said liquid medium is dissipated, said heat exchange system being such that the temperature of said liquid medium at a predetermined location in said system is, during the normal operating conditions of said engine, between the freezing point and boiling point of water, (a) heat exchange water condensing means to condense moisture from the exhaust of said engine, (b) exhaust directing means to receive at least a portion of said exhaust and direct said exhaust portion through said heat exchange water condensing means, and to discharge what remains of said exhaust from said heat exchange water condensing means, (c) a reservoir means to receive condensed water from said heat exchange water condensing means, (d) windshield spray means arranged to direct water onto said automobile windshield, (e) pump means operatively connected to said spray means and said reservoir so as to pump water from said reservoir through said spray means and onto said windshield, (f) other heat exchange means to direct at least a portion of said liquid heat exchange medium which in normal operation is at a temperature between the freezing and boiling point of water, into heat exchange relationship with said heat exchange water condensing means and into heat exchange relationship with water condensed from said heat exchange water condensing means, and (g) said automobile being provided with after burner means which is disposed to receive exhaust from said engine and provide substantially complete combustion of said exhaust, and said exhaust directing means receiving said exhaust portion after said exhaust has passed through said afterburner means.

13. In combination with an automotive vehicle having a passenger compartment and having a combustion engine which discharges exhaust thereof from said engine,
  (a) condensing means to condense water from said engine exhaust,
  (b) exhaust directing means to direct at least a portion of the engine exhaust through said condensing means,
  (c) water evaporating, air cooling heat exchange means,
  (d) air circulating means to cause air for said passenger compartment to be put into heat exchange relationship with said heat exchange means and be moved to said passenger compartment,
  (e) means to collect water from said condensing means and bring said water into evaporative heat exchange relationship with said heat exchange means, and
  (f) said water evaporating, air cooling heat exchange means comprising an evaporating portion from which said water is evaporated into air other than air for said passenger compartment and an air cooling portion which is in heat exchange relationship with air for said passenger compartment and in heat exchange relationship with said evaporating portion, whereby heat from the air for the passenger compartment is transmitted to said evaporating portion.

14. The apparatus as recited in claim 13, wherein said automobile is provided with afterburner means, and said exhaust directing means receives said exhaust portion after said exhaust has passed through said afterburner means.

15. In combination with an automotive vehicle having a passenger compartment and having a combustion engine which discharges exhaust thereof from said engine,
  (a) condensing means to condense water from said engine exhaust,
  (b) exhaust directing means to direct at least a portion of the engine exhaust through said condensing means,
  (c) water evaporating, air cooling heat exchange means,
  (d) air circulating means to cause air for said passenger compartment to be put into heat exchange relationship with said heat exchange means and be moved to said passenger compartment,
  (e) means to collect water from said condensing means and bring said water into evaporative heat exchange relationship with said heat exchange means, and
  (f) said water evaporating, air cooling heat exchange means comprising means to evaporate water into air other than air for said passenger compartment, said last named means being in heat exchange relationship with the air for said passenger compartment so as to absorb heat therefrom and dissipate said heat to the air other than the air for said passenger compartment.

16. In combination with an automotive vehicle having a passenger compartment and having a combustion engine which discharges exhaust thereof from said engine,
  (a) condensing means to condense water from said engine exhaust,
  (b) exhaust directing means to direct at least a portion of the engine exhaust through said condensing means,
  (c) water evaporating, air cooling heat exchange means,
  (d) air circulating means to cause air for said passenger compartment to be put into heat exchange relationship with said heat exchange means and be moved to said passenger compartment,
  (e) means to collect water from said condensing means and bring said water into evaporative heat exchange relationship with said heat exchange means, and
  (f) compressor means being arranged to compress air for said passenger compartment, in a manner that said air is under superatmospheric pressure when it is in heat exchange relationship with said heat exchange means, whereby the temperature of said air is increased and heat from said air is dissipated more rapidly to said heat exchange means, said heat exchange means being such that said water is evaporated into air other than the air for the passenger compartment.

17. In combination with an automotive vehicle having a passenger compartment and having a combustion engine which discharges exhaust thereof from said engine,
  (a) condensing means to condense water from said engine exhaust,
  (b) exhaust directing means to direct at least a portion of the engine exhaust through said condensing means,
  (c) water evaporating, air cooling heat exchange means,
  (d) air circulating means to cause air for said passenger compartment to be put into heat exchange relationship with said heat exchange means and be moved to said passenger compartment,
  (e) means to collect water from said condensing means and bring said water into evaporative heat exchange relationship with said heat exchange means, and
  (f) vacuum pump means arranged to cause a pressure reduction at a portion of said heat exchange means where water is evaporated from said heat exchange means, with said vacuum pump means arranged to exhaust to an intake manifold of said vehicle whereby said water as it is evaporated into said vacuum pump means is directed into said intake manifold.

18. In combination with an automotive vehicle having a passenger compartment and having a combustion engine which discharges exhaust thereof from said engine,
  (a) condensing means to condense water from said engine exhaust,
  (b) exhaust directing means to direct at least a portion of the engine exhaust through said condensing means,
  (c) water evaporating, air cooling heat exchange means,
  (d) air circulating means to cause air for said passenger compartment to be put into heat exchange relationship with said heat exchange means and be moved to said passenger compartment,
  (e) means to collect water from said condensing means and bring said water into evaporative heat exchange relationship with said heat exchange means, and
  (f) vacuum pump means arranged to cause a pressure reduction at a portion of said heat exchange means where water is evaporated from said heat exchange means, and said heat exchange means having an air cooling portion separate from said portion where said water is evaporated, but in heat exchange relationship therewith.

19. In combination with an automotive vehicle having a passenger compartment and having a combustion engine which discharges exhaust thereof from said engine,
  (a) condensing means to condense water from said engine exhaust,
  (b) exhaust directing means to direct at least a portion of the engine exhaust through said condensing means,
  (c) water evaporating, air cooling heat exchange means,
  (d) air circulating means to cause air for said passenger compartment to be put into heat exchange relationship with said heat exchange means and be moved to said passenger compartment,
  (e) means to collect water from said condensing means and bring said water into evaporative heat exchange relationship with said heat exchange means, and
  (f) said heat exchange means presenting evaporating surface means and air cooling surface means, which two surface means are separated from one another but in heat exchange relationship with one another, and said air circulating means moves air for the passenger compartment into heat exchange relationship with said air cooling surface means, while there are other means to move other air over said evaporating surface means so as to evaporate the water therefrom.

20. The apparatus as recited in claim 19, wherein there is also water bearing pad means so arranged that air for said passenger compartment can be directed through said pad means.

21. In combination with an automotive vehicle having a passenger compartment, a combustion engine which discharges exhaust thereof from said engine and a heat exchange system which directs a heat exchange medium into heat exchange relationship with said engine so as to absorb heat from said engine and dissipates the heat to the surrounding atmosphere,
   (a) heat exchange condensing means which functions to bring at least a portion of said heat exchange medium of said heat exchange system into heat exchange relationship with one another so as to condense water from said exhaust,
   (b) exhaust directing means to receive at least a portion of said exhaust and direct said exhaust portion through said heat exchange condensing means and to discharge from said heat exchange condensing means what remains of the exhaust directed to said heat exchange condensing means,
   (c) other means to direct said heat exchange medium through said heat exchange condensing means,
   (d) water evaporating, air cooling heat exchange means,
   (e) air circulating means to cause air for said passenger compartment to be put into heat exchange relationship with said water evaporating, air cooling heat exchange means,
   (f) means to direct water from said heat exchange condensing means into evaporative heat exchange relationship with said water evaporating, air cooling heat exchange condensing means,
   (g) reservoir means to store the water condensed from said heat exchange condensing means, and
   (f) valve means to vary the amount of exhaust directed to said heat exchange condensing means in relation to the rate at which said water is dissipated.

References Cited
UNITED STATES PATENTS

| | | | |
|---|---|---|---|
| 1,728,973 | 9/1929 | Lonergan | 60—30 X |
| 1,987,604 | 1/1935 | Corbett | 165—99 |
| 2,062,859 | 12/1936 | Bowen | 60—29 X |
| 2,087,411 | 7/1939 | Lundquist | 123—119 |
| 2,479,766 | 8/1949 | Mulvany | 244—95 X |
| 2,576,198 | 11/1951 | Stuart | 180—1 X |
| 2,591,187 | 4/1952 | Nelson | 123—41.21 |
| 2,612,745 | 10/1952 | Vecchio | 60—29 |
| 2,626,184 | 1/1953 | Caldwell | 180—1 X |
| 2,796,014 | 6/1957 | Montgomery et al. | 62—314 X |
| 2,817,960 | 12/1957 | Lustwerk et al. | 62—314 X |

ROBERT A. O'LEARY, *Primary Examiner.*

M. A. ANTONAKAS, *Assistant Examiner.*